United States Patent
Ress, Jr. et al.

(10) Patent No.: US 6,367,241 B1
(45) Date of Patent: Apr. 9, 2002

(54) PRESSURE-ASSISTED ELECTROMAGNETIC THRUST BEARING

(75) Inventors: Robert Anthony Ress, Jr., Carmel; Mark Stephen Henry, Indianapolis, both of IN (US)

(73) Assignees: Allison Advanced Development Company; Rolls-Royce Corporation, both of Indianapolis, IN (US)

( * ) Notice: Subject to any disclaimer, the term of this patent is extended or adjusted under 35 U.S.C. 154(b) by 0 days.

(21) Appl. No.: 09/384,497

(22) Filed: Aug. 27, 1999

(51) Int. Cl.[7] ................................................. F02C 6/18
(52) U.S. Cl. ..................... 60/39.07; 415/104; 415/105; 415/106; 417/365; 310/90.5
(58) Field of Search ................................ 415/104, 105, 415/106; 60/39.07; 310/90.5; 417/365

(56) References Cited

U.S. PATENT DOCUMENTS

| | | | |
|---|---|---|---|
| 4,057,369 A | 11/1977 | Isenberg et al. | |
| 4,579,508 A | 4/1986 | Tsumaki et al. | |
| 4,787,829 A | 11/1988 | Miyazaki et al. | |
| 4,864,810 A | 9/1989 | Hines | |
| 4,918,345 A | 4/1990 | Vaillant de Guelis et al. | |
| 4,988,906 A | 1/1991 | Littlefield | |
| 4,993,917 A | 2/1991 | Kulle et al. | |
| 5,003,211 A | 3/1991 | Groom | |
| 5,027,280 A | 6/1991 | Ando et al. | |
| 5,028,204 A | 7/1991 | Kulle et al. | |
| 5,046,151 A | 9/1991 | Yamamura | |
| 5,104,284 A | * 4/1992 | Hustak, Jr. et al. | 415/105 |
| 5,126,612 A | 6/1992 | Girault | |
| 5,127,792 A | 7/1992 | Katsuta et al. | |
| 5,141,389 A | 8/1992 | Bear et al. | |
| 5,201,642 A | 4/1993 | Hinckley | |
| 5,236,318 A | 8/1993 | Richardson, Jr. | |
| 5,248,239 A | 9/1993 | Andrews | |
| 5,263,816 A | 11/1993 | Weimer et al. | |
| 5,302,874 A | 4/1994 | Pinkerton | |
| 5,310,311 A | 5/1994 | Andres et al. | |
| 5,312,225 A | 5/1994 | Lorenzen | |
| 5,312,226 A | 5/1994 | Miura et al. | |
| 5,355,040 A | * 10/1994 | New | 310/90.5 |
| 5,355,042 A | 10/1994 | Lewis et al. | |
| 5,658,125 A | 8/1997 | Burns et al. | |
| 5,735,666 A | 4/1998 | Johnston | |
| 5,749,700 A | 5/1998 | Henry et al. | |
| 5,836,739 A | 11/1998 | Haramura et al. | |

* cited by examiner

*Primary Examiner*—Charles G. Freay
*Assistant Examiner*—Eric D. Hayes
(74) *Attorney, Agent, or Firm*—Woodard, Emhardt, Naughton, Moriarty & McNett

(57) ABSTRACT

A thrust compensation apparatus for high-speed rotating machinery includes an electromagnetic thrust bearing having a thrust rotor and a thrust stator, a first chamber filled with a pressurized medium on one side of the bearing, and a second chamber on the other side of the bearing. The pressure differential across the bearing augments the electromagnetic force between the rotor and stator in order to counteract the axial thrust load of the high-speed rotating machinery.

30 Claims, 4 Drawing Sheets

PRESSURE-ASSISTED ELECTROMAGNETIC THRUST BEARING

BACKGROUND OF THE INVENTION

This invention relates generally to rotating machinery, and particularly to gas turbine engines that are subject to axial thrust loads. More particularly, the present invention relates to a thrust compensation apparatus for rotating machinery that utilizes an electromagnetic thrust disk aided by pressure thereacross to counteract axial thrust loads. Although, the present invention was developed for use in a gas turbine engine, certain applications may be outside of this field.

It is well known that a gas turbine engine integrates a compressor and a turbine having components that rotate at extremely high speeds in a high temperature environment. One component being a rotor disk that carries a row of airfoils utilized to influence the gaseous flow within the engine. The rotating components typically cooperate with a rotatable shaft and are supported by radial and thrust bearings that must withstand significant dynamic and static loads within a hostile environment. During operation of the gas turbine engine the bearings are subjected to forces including: shock loads—such as from landings; maneuver loads—associated with sudden change in direction, and centrifugal forces attendant with the rotating components.

As engine designers continue to increase the efficiency and power output from gas turbine engines the application of magnetic bearings for supporting and controlling the rotor and rotatable shaft becomes desirable. The integration of magnetic bearings into the engine would allow the rotor shaft to be supported by magnetic forces, eliminate frictional forces, along with mechanical wear and the lubrication system.

A magnetic thrust bearing includes a magnetic flux field and a rotatable thrust disk that is acted upon by the magnetic flux field. The application of magnetic bearings in flight-weight gas turbine engines requires a compactness of bearing design, which ultimately equates to lighter weight. The capacity of electromagnetic bearings to carry axial thrust loads is generally limited by the size of the thrust disk. Rotating machinery that operate at high speeds may require magnetic bearings so large as to be impractical, if not impossible, to implement. Thus, as a result of this limitation on the thrust capacity of electromagnetic bearings, a conventional thrust balance piston is often incorporated into the rotor system of high-speed machinery.

Although the prior techniques utilizing magnetic thrust bearings for gas turbine engines are steps in the right direction, the need for additional improvements still remains. The present invention satisfies the need in a novel and unobvious way.

SUMMARY OF THE INVENTION

One aspect of the invention described herein accomplishes a reduction in axial thrust loads in a high-speed machine by utilizing an electromagnetic thrust bearing having a pressure differential across the electromagnetic thrust disk to gain additional thrust capacity.

One form of the present invention contemplates a gas turbine engine having an electromagnetic thrust bearing located within the engine. The thrust bearing comprises a thrust disk mounted on a shaft of a rotor system, and a thrust bearing stator coupled to a support frame. A pressurized fluid is provided to one side of the electromagnetic thrust bearing. Seals are formed integral with the thrust disk rotor to create a higher-pressure chamber on one side of the thrust bearing and a lower pressure chamber on the other side of the thrust bearing. The pressure differential across the thrust bearing augments the electromagnetic attractive force between the thrust rotor and thrust stator to counter the axial thrust load.

Another form of the present invention contemplates the use of mechanically attached seals on the thrust disk rotor.

One object of the present invention is to provide a unique electromagnetic thrust bearing system.

Related objects and advantages of the present invention will be apparent from the following description.

DESCRIPTION OF THE PREFERRED EMBODIMENTS

Figure 1:
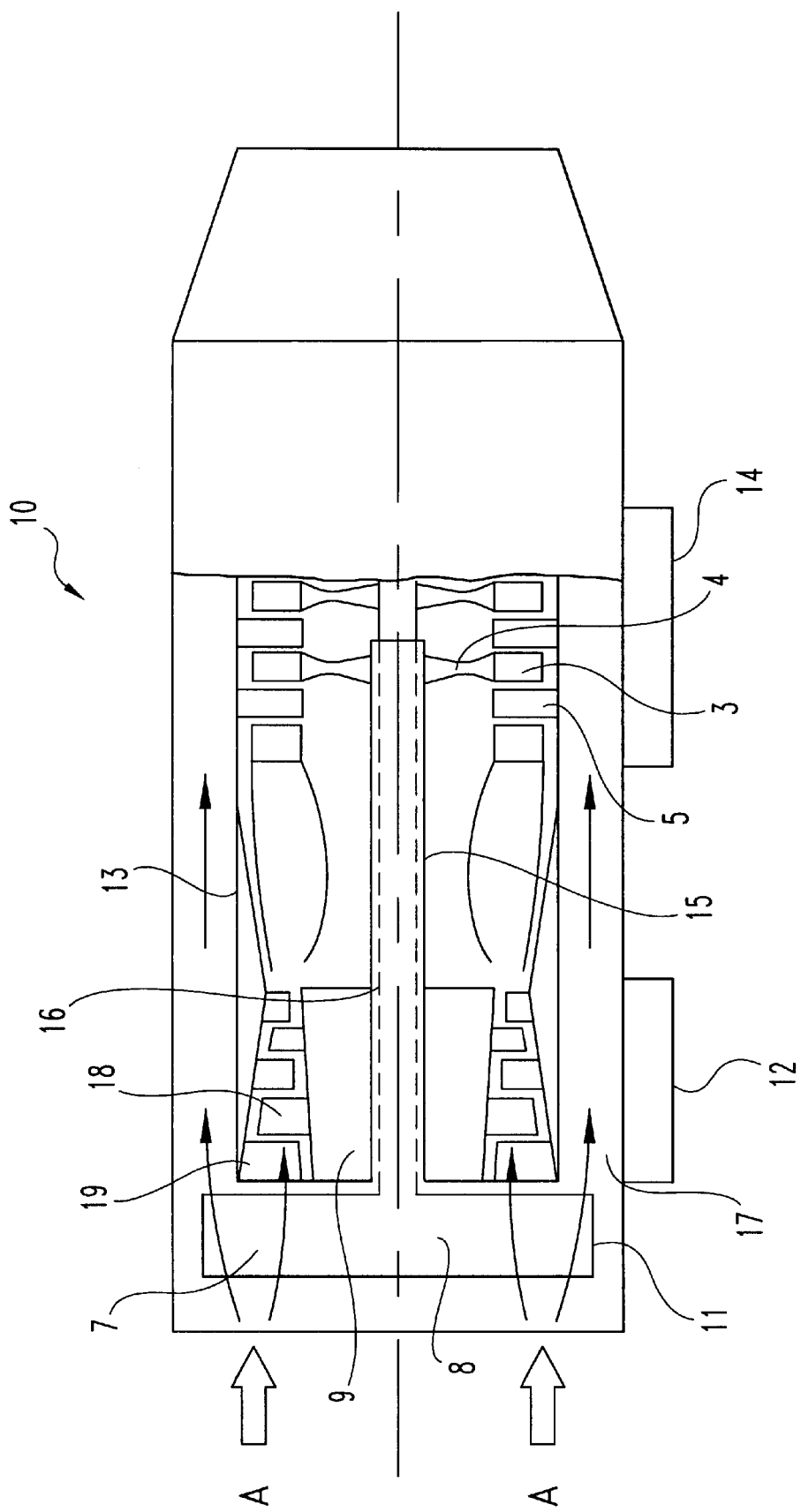
FIG. 1 is a schematic of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a gas turbine engine 10 which includes a fan section 11, a compressor section 12, a combustor section 13, and a turbine section 14 that are integrated together to produce an aircraft flight propulsion engine. This type of gas turbine engine is generally referred to as a turbo-fan. One alternate form of a gas turbine engine includes a compressor, a combustor, and a turbine that have been integrated together to produce an aircraft flight propulsion engine without the fan section. The term aircraft is generic and includes helicopters, airplanes, missiles, unmanned space devices and any other substantially similar devices. It is important to realize that there are a multitude of ways in which the gas turbine engine components can be linked together. Additional compressors and turbines could be added with intercoolers connecting between the compressors and reheat combustion chambers could be added between the turbines.

A gas turbine engine is equally suited to be used for an industrial application. Historically, there has been widespread application of industrial gas turbine engines, such as pumping sets for gas and oil transmission lines, electricity generation, and naval propulsion.

The compressor section 12 includes a rotor 9 having a plurality of compressor blades 18 coupled thereto. The rotor 9 is affixed to shaft 15 that is rotatable within the gas turbine engine 10. A plurality of compressor vanes 19 are positioned within the compressor section 12 to direct the fluid flow relative to blades 18. Turbine section 14 includes a plurality of turbine blades 3 that are coupled to rotor disk 4. The rotor disk 4 is affixed to the shaft 15, which is rotatable within the gas turbine engine 10. Energy extracted in the turbine section 14 from the hot gas exiting the combustor section 13 is transmitted through shaft 15 to drive the compressor section 12. Further, a plurality of turbine vanes 5 are positioned within the turbine section 14 to direct the hot gaseous flow stream exiting the combustor section 13.

The turbine section 14 provides power to a fan shaft 16, which drives the fan section 11. The fan section 11 includes a fan 8 having a plurality of fan blades 7. Air enters the gas turbine engine 10 in the direction of arrows A and passes through the fan section 11 into the compressor section 12 and bypass duct 17. Further details related to the principles and components of a conventional gas turbine engine will not be described herein as they are believed known to one of ordinary skill in the art.

Figure 2:
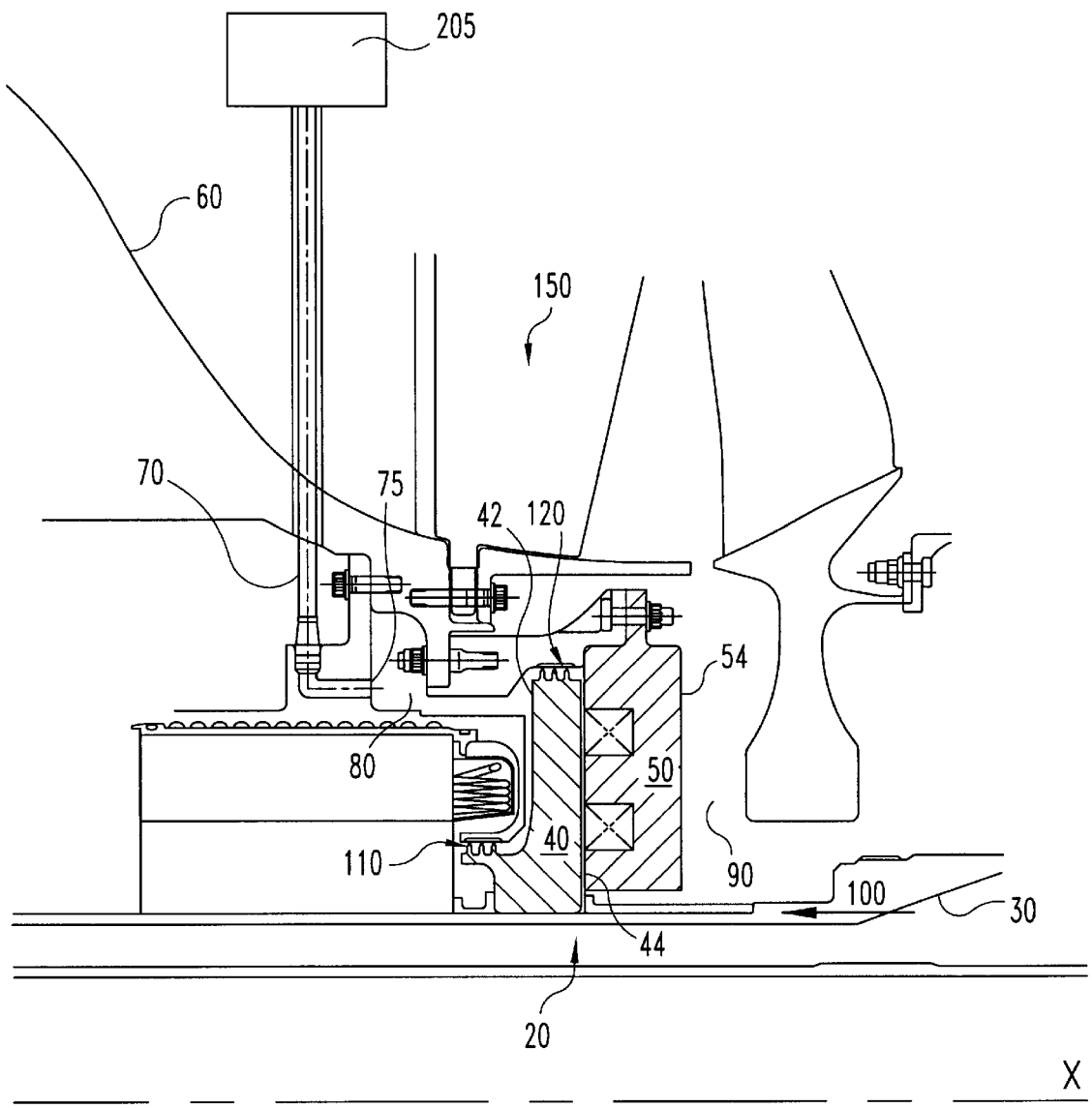
FIG. 2 is a partial cross-sectional view of a rotating machine including a thrust compensating apparatus according to one embodiment of the present invention.

With reference to FIG. 2, a general arrangement of a thrust compensation apparatus 150 is illustrated for a high-speed rotating machine. A gas turbine engine, integrating a compressor, a combustor, and a power turbine, is one form of high-speed rotating machine. Thrust compensation apparatus 150 comprises electromagnetic thrust bearing 20. The electromagnetic bearing of the present invention is an active electromagnetic bearing and is positioned to act on rotatable shaft 30 to counteract axial thrust loading. Active electromagnetic thrust bearing 20 includes thrust disk rotor 40 coupled to rotatable shaft 30 of the rotor system. Electromagnetic thrust bearing 20 further includes thrust bearing stator 50 coupled to mechanical housing or support frame 60. Thrust disk rotor 40 is axially spaced apart from thrust disk rotor 50. Thrust disk rotor 40, therefore, rotates with rotatable shaft 30; while, thrust-bearing stator remains stationary with respect to support frame 60.

Thrust bearing stator 50 includes a metal core and a wire coil connected to a power supply. The electromagnetic thrust bearing is energized when a power supply produces a current in the coil, which induces the magnetic flux field, which in turn intercepts the thrust disk rotor 40. Electromagnetic bearing 20 is connected to a controller (FIG. 4) that provides the functionality necessary to control the magnetic bearings.

Electromagnetic thrust disk rotor 40 is a substantially annular member that is press fit onto shaft 30. In the preferred embodiment thrust disk rotor 40 is symmetrical about an axial centerline X. Upon the thrust disk 40 being subjected to the magnetic field, the magnetically responsive thrust disk is attracted toward thrust bearing stator 50.

A pressurized medium from any suitable source is supplied to thrust compensation apparatus 150 through a passageway 70, and in one embodiment the passageway is defined by a tube. The tube 70 communicates the pressurized medium through struts in frame 60. In a gas turbine engine, high-pressure air can be bled from the mid or aft section of the compressor and piped to support frame 60. The compressor need not necessarily supply the pressurized fluid, it could be supplied by an external pressurized fluid source such as, but not limited to, a high pressure facility air source (shop air). Further, in an alternate embodiment the pressurized medium is cooled as it passes through passageways formed in struts in the frame. The passageways through the struts can contain surface area enhancing ribs and/or pedestals to aid in the heat transfer from the pressurized fluid.

FIG. 2 illustrates the discharge of high-pressure air from tube 70 into a first substantially fluid tight chamber 80 through discharge port 75. Forward face 42 of thrust disk rotor 40 forms the aft wall of chamber 80; thus, the pressurized medium is brought to act on forward face 42 of thrust disk rotor 40. Aft of thrust bearing 20 is a second substantially fluid tight chamber 90 that communicates with a source of air having a pressure lower than that supplied through tube 70. In a gas turbine engine, chamber 90 could, for example, communicate with the inlet to the compressor of a gas turbine engine. Consequently, the pressure in chamber 90 is less than the pressure in chamber 80. This pressure differential across thrust bearing 20 augments the electromagnetic attractive force between thrust disk rotor 40 and thrust bearing stator 50 in order to counter forward axial thrust load 100. While air is the preferred medium in chambers 80 and 90, the present invention contemplates the use of other suitable fluid media.

Thrust compensation apparatus 150 includes inner seal 110 and outer seal 120 that define chamber 80 on one side of thrust bearing 20 and chamber 90 on the other side of thrust bearing 20. Outer seal 120 is positioned between thrust disk rotor 40 and frame 60 in the proximity of the outer diameter of thrust disk rotor 40, and inner seal 110 is positioned between thrust disk rotor 40 and an intermediate piece of frame 60 in the proximity of the inner diameter of thrust disk 40. In the preferred embodiment, inner seal 110 is located near the inner diameter of thrust disk rotor 40, and outer seal 120 is located at the outer diameter of thrust disk rotor 40. Although knife-edge, labyrinth seals are illustrated in the drawings, other seal types including brush seals and film riding face seals are contemplated. Furthermore, while inner seal 110 and outer seal 120 are preferably formed integral with thrust disk rotor 40, seals 110 and 120 may alternatively be mechanically attached at the desired locations on/or adjacent to the thrust disk rotor 40.

Figure 3:
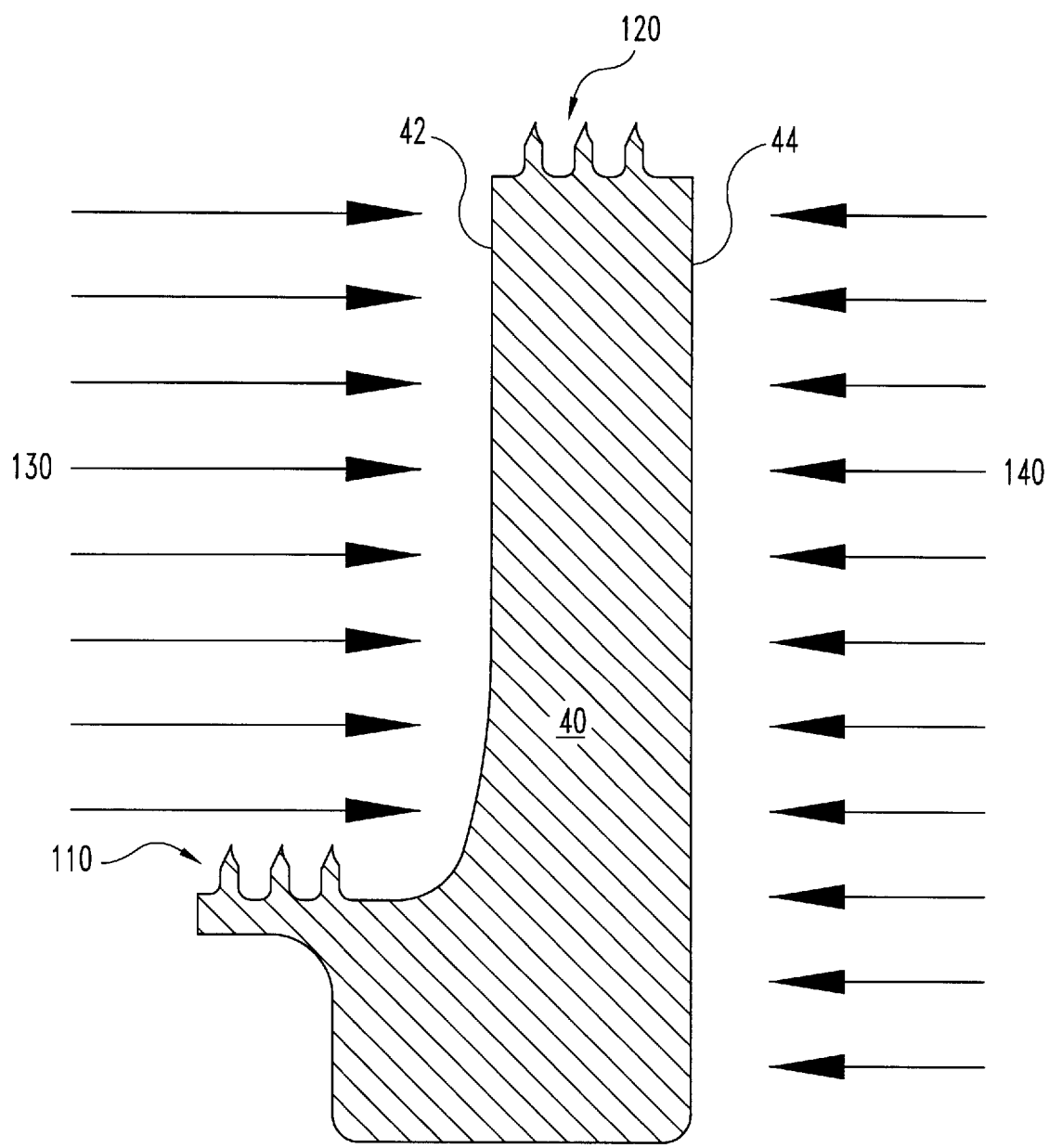
FIG. 3 is a cross-sectional view of the thrust disk rotor of FIG. 2 illustrating schematically the pressure loads thereon.

A schematic of pressure distribution on thrust disk rotor 40 is illustrated in FIG. 3. The pressurized medium in chamber 80 acts on forward face 42 of thrust disk rotor 40 to produce rearward force 130. The fluid in chamber 90 acts on aft face 54 of thrust bearing stator 50 and, in turn, on aft face 44 of thrust disk rotor 40 to produce forward force 140. Thrust disk rotor 40 and thrust-bearing stator 50 may have any suitable geometries that permit the rotation of thrust rotor disk 40 with shaft 30 without impinging on thrust bearing stator 50. In the preferred embodiment, aft face 44 of thrust disk rotor 40 is substantially parallel to a portion of forward face 42 of thrust disk rotor 40, and both faces 44 and 42 are oriented substantially in the radial direction. Rearward force 130 is larger than forward force 140, thereby resulting in a net rearward axial pressure load on thrust bearing 20. This net rearward pressure load assists electromagnetic thrust bearing 20 to counter balance forward axial thrust load 100 illustrated in FIG. 2.

Figure 4:
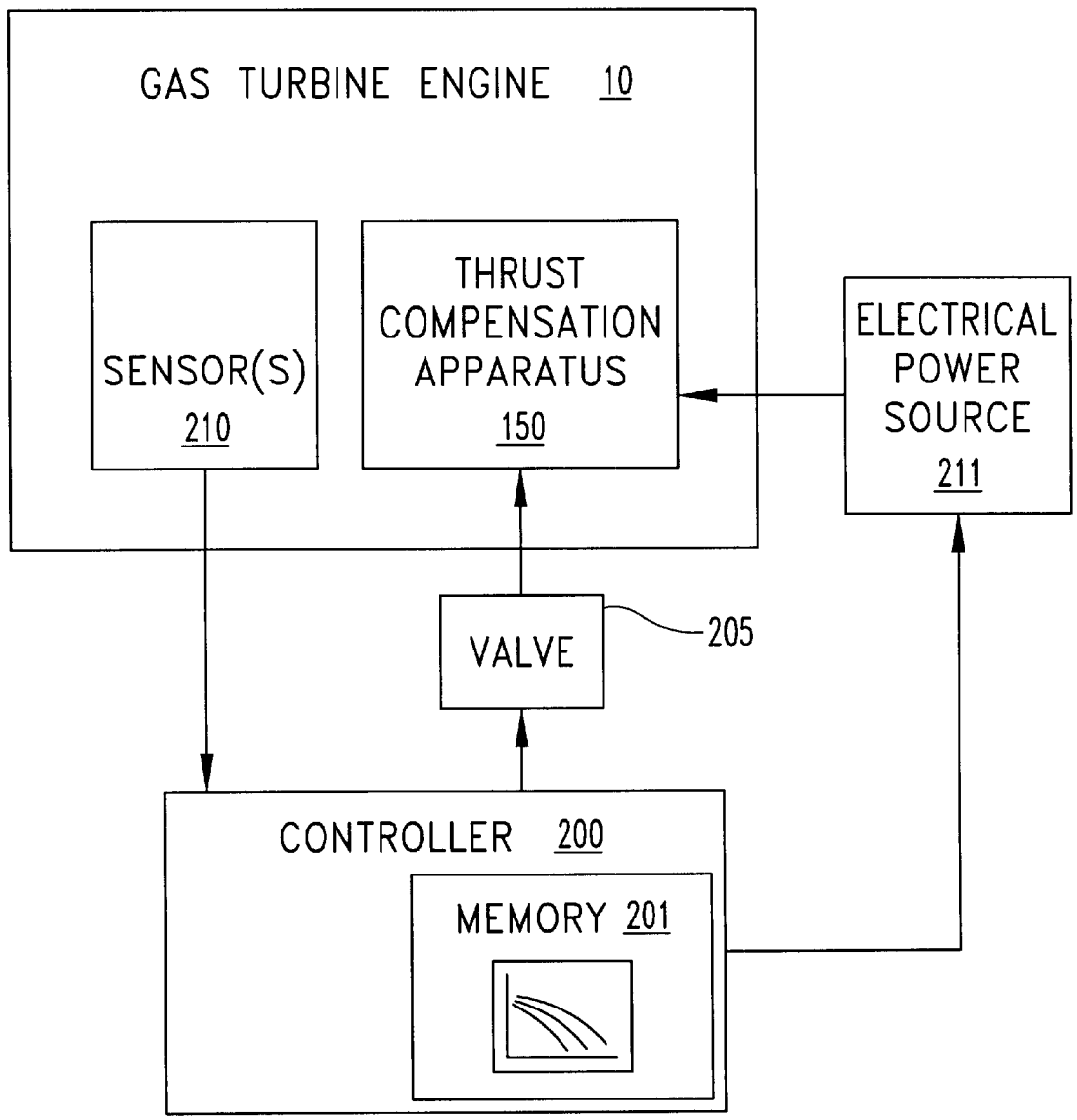
FIG. 4 is a illustrative block diagram of one embodiment of a control system for a thrust compensation apparatus.

With reference to FIG. 4, there is illustrated a block diagram of one embodiment of a control system for the gas turbine engine 10. However, other control systems are contemplated herein. The control system includes controller 200 that has memory 201. Controller 200 may be comprised of one or more components configured as a single unit. Alternatively, when of a multi-component form, controller 200 may have one or more components remotely located relative to the others, or otherwise have its components distributed. Controller 200 may be programmable, a state logic machine or other type of dedicated hardware, or a hybrid combination of programmable and dedicated hardware. One or more components of controller 200 may be of the electronic variety defining digital circuitry, analog circuitry, or both. As an addition or alternative to electronic circuitry, controller 200 may include one or more mechanical, hydraulic, pneumatic, or optical control elements.

In one embodiment including electronic circuitry, controller 200 has an integrated, semiconductor processing unit operatively coupled to one or more solid-state, semiconductor memory devices defining, at least in part, memory 201. For this embodiment, at least a portion of memory 201 contains programming to be executed by the processing unit and is arranged for reading and writing of data in accordance with one or more routines executed by controller 200.

Memory 201 may include one or more types of solid-state electronic memory, magnetic memory or optical memory. For example, memory 201 may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a CD ROM); a magnetically encoded hard disc, floppy disc, tape, or cartridge media; or a combination of any of these memory types. Also, memory 201 may be volatile, nonvolatile or a hybrid combination of volatile and nonvolatile varieties.

Besides memory 201, controller 200 may also include any oscillators, control clocks, interfaces, signal conditioners, filters, limiters, Analog-to-Digital (A/D) converters, Digital-to-Analog (D/A) converters, communication ports, or other types of operators as would occur to those skilled in the art to implement the present invention Controller 200 may be arranged to provide a number of routines to regulate various aspects of the operation of gas turbine engine 10. Alternatively, controller 200 may be dedicated to control of only one operational aspect of system 150. Controller 200 is operatively coupled to one or more sensors 210 to detect corresponding information about the gas turbine engine 10. Sensors 210 may provide a signal in either a digital or analog format compatible with associated equipment. Correspondingly, equipment coupled to each sensor, such as controller 200, is configured to condition and convert sensor signals to the appropriate format, as required. The controller 200 is also operatively coupled to thrust compensation apparatus 150 via electrical power source 211.

The thrust compensation apparatus control system regulates the pressure applied to the forward face 42 of the thrust disk rotor 40. In one embodiment a valve 205 in the pressurized medium supply line is utilized to regulate the pressure of the pressurized fluid. The thrust compensation apparatus control system operating in a closed loop mode can calculate magnetic bearing thrust load based on current, voltage or implied flux. From this information the thrust compensation apparatus control system can set the pressure acting on the forward face 42 to reduce the thrust load on the electromagnetic bearing. Further, the thrust compensation apparatus control system, by monitoring altitude, mach number, and engine thrust can apply a pressure level from a stored data table.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. The apparatus wherein said first medium is air.
2. The apparatus of claim 1, wherein said second medium is air.
3. The apparatus of claim 2, wherein said first and second faces of said thrust disk are substantially parallel.
4. The apparatus of claim 3, wherein said first face of the thrust disk is orientated in a substantially radial direction from said shaft.
5. An apparatus comprising:
   a support frame;
   a shaft rotatable relative to said support frame;
   an electronic thrust disk coupled to said rotatable shaft, said thrust disk having a first face and a second face and an outer diameter and an inner diameter;
   an outer seal between said thrust disk and said support frame and located in the proximity of said outer diameter of said thrust disk;
   an electromagnetic thrust stator coupled to said support frame and spaced from said second face of the thrust disk;
   a first chamber adopted to contain a first medium and disposed in fluid communication with said first face of said electromagnetic thrust disk; and
   a second chamber adopted to contain a second medium and in fluid communication with said second face of the electromagnetic thrust disk, said second medium having a pressure less than that of said first medium.
6. The apparatus of claim 1, wherein said outer seal is formed integral with said thrust disk rotor.
7. The apparatus of claim 1, wherein said outer seal comprises at least one knife-edge, labyrinth seal.
8. The apparatus of claim 1, further comprising an inner seal between said thrust disk and said support frame and located in the proximity of said inner diameter of said thrust disk.
9. The apparatus of claim 8, wherein said inner seal is formed integral with said thrust disk.
10. The apparatus of claim 8, wherein said inner seal comprises at least one knife-edge, labyrinth seal.
11. An apparatus, comprising:
    a gas turbine engine;
    a support frame within said gas turbine engine;
    a shaft rotatable relative to said support frame;
    an electromagnetic thrust bearing within said support frame, having a first side and a second side;
    a first chamber adjacent said first side of said electromagnetic thrust bearing, said first chamber adapted to contain a first fluid exerting a first pressure on said first side of said electromagnetic thrust bearing; and
    a second chamber adjacent to said second side of said electromagnetic thrust bearing, said second chamber adapted to contain a second fluid exerting a second pressure on said second side of said electromagnetic thrust bearing that is less than said first pressure of said first fluid.
12. The apparatus of claim 11, wherein said first chamber is a substantially fluid tight chamber, and said second chamber is a substantially fluid tight chamber.
13. The apparatus of claim 11, further comprising means for sealing said first chamber from said second chamber across said electromagnetic thrust bearing.
14. The apparatus of claim 13, wherein said electromagnetic thrust bearing further includes a thrust disk coupled to said shaft and having an inner diameter and an outer diameter.
15. The apparatus of claim 14, wherein said means for sealing is formed integral with said thrust disk and comprises an inner seal in the proximity of said inner diameter of said thrust disk and an outer seal in the proximity of said outer diameter of said thrust disk.

16. The apparatus of claim 11, wherein said gas turbine engine includes a compressor having an inlet connected to said second chamber, and an outlet connected to said first chamber and through which compressed air flows.

17. The apparatus of claim 11, wherein said gas turbine engine includes a mid-compressor bleed connected in fluid communication with said first chamber and adapted for a compressed fluid to flow to said first chamber.

18. The apparatus of claim 11, which further includes an external pressurized fluid source, wherein said external pressurized fluid source is connected to said first chamber.

19. The apparatus of claim 11:
wherein said first chamber is a substantially fluid tight chamber, and said second chamber is a substantially fluid tight chamber;
wherein said electromagnetic thrust bearing includes a thrust disk coupled to said shaft and having an inner diameter and an outer diameter;
which further includes an inner seal in the proximity of said inner diameter of said thrust disk and an outer seal in the proximity of said outer diameter of said thrust disk; and
wherein said gas turbine engine includes a compressor having an inlet connected to said second chamber, and an outlet connected to said first chamber and adapted for compressed air to flow through.

20. The apparatus of claim 11, wherein said support frame includes a passageway therein, said passageway adapted for the passage of said first fluid to said first chamber.

21. The apparatus of claim 20, wherein said passageway includes a plurality of heat transfer enhancing members extending into said passageway.

22. The apparatus of claim 20, wherein said frame includes at least one strut, and wherein said at least one strut has said passageway therein.

23. The apparatus of claim 11, wherein said gas turbine engine includes a mid-compressor bleed connected in fluid communication with said first chamber, and wherein said frame defines at least one strut having a passageway formed therein for the passage of said first fluid, and wherein said first fluid is cooled as it passes through said passageway.

24. The apparatus of claim 11, wherein said frame defines at least one strut having a passageway formed therein for the passage of said first fluid, and wherein said first fluid is cooled as it passes through said passageway.

25. The apparatus of claim 11, wherein said frame includes a strut with a passageway formed therein that is adapted for the passage of said first fluid, and wherein said strut includes heat transfer means for cooling the first fluid passing through said passageway.

26. A method comprising:
providing an apparatus including a mechanical housing, a rotatable shaft within said housing, and an active electromagnetic thrust bearing having a thrust disk coupled to said shaft;
rotating the shaft within said mechanical housing;
energizing said active electromagnetic thrust bearing;
forming a substantially fluid tight first chamber on one side of the thrust disk; and
flowing a pressurized fluid into the substantially fluid tight first chamber and against the thrust disk to counteract a portion of an axial thrust load on the rotating shaft.

27. The apparatus of claim 5, wherein said first and second faces of said thrust disk are substantially parallel; and which further comprises an inner seal between said thrust disk and said support frame and located in the proximity of said inner diameter of said thrust disk.

28. The apparatus of claim 27, wherein said inner seal comprises at least one knife-edge labyrinth seal and wherein said outer seal comprises at least one knife-edge labyrinth seal.

29. The method of claim 26, which further comprises forming a substantially fluid tight second char on the other side of the thrust disk.

30. The method of claim 29, which further includes flowing a pressurized fluid into the substantially fluid tight second chamber, and wherein the pressure in the substantially fluid tight second chamber is less than the pressure in the substantially fluid tight first chamber.

* * * * *

UNITED STATES PATENT AND TRADEMARK OFFICE
CERTIFICATE OF CORRECTION

PATENT NO. : 6,367,241 B1 Page 1 of 1
DATED : April 9, 2002
INVENTOR(S) : Robert Anthony Ress, Jr. and Mark Stephen Henry It is certified that error appears in the above-identified patent and that said Letters Patent is hereby corrected as shown below:

<u>Column 5,</u>
Line 63, after the word "apparatus", insert -- of claim 5, --.
Line 66, change "2" to -- 5 --.

<u>Column 6,</u>
Line 1, change "3" to -- 5 --.
Line 7, change "electronic" to -- electromagnetic --.
Line 17, change "adopted" to -- adapted --.
Line 20, change "adopted" to -- adapted --.
Line 24, change "1" to -- 5 --.
Line 26, change "1" to -- 5 --.
Line 28, change "1" to -- 5 --.

<u>Column 8,</u>
Line 30, after the word "seal", add a comma (-- , --).
Line 34, change "char" to -- chamber --.

Signed and Sealed this

Twenty-fourth Day of December, 2002

JAMES E. ROGAN
*Director of the United States Patent and Trademark Office*